Oct. 16, 1956  F. AMIOT  2,766,598
METHOD FOR THE PRESERVATION OF FISH
Filed Oct. 23, 1950  6 Sheets-Sheet 1

INVENTOR
FELIX AMIOT
BY
ATTORNEYS

Oct. 16, 1956  F. AMIOT  2,766,598
METHOD FOR THE PRESERVATION OF FISH
Filed Oct. 23, 1950  6 Sheets-Sheet 4

INVENTOR
FELIX AMIOT
BY
Bailey, Stephens & Huettig
ATTORNEYS

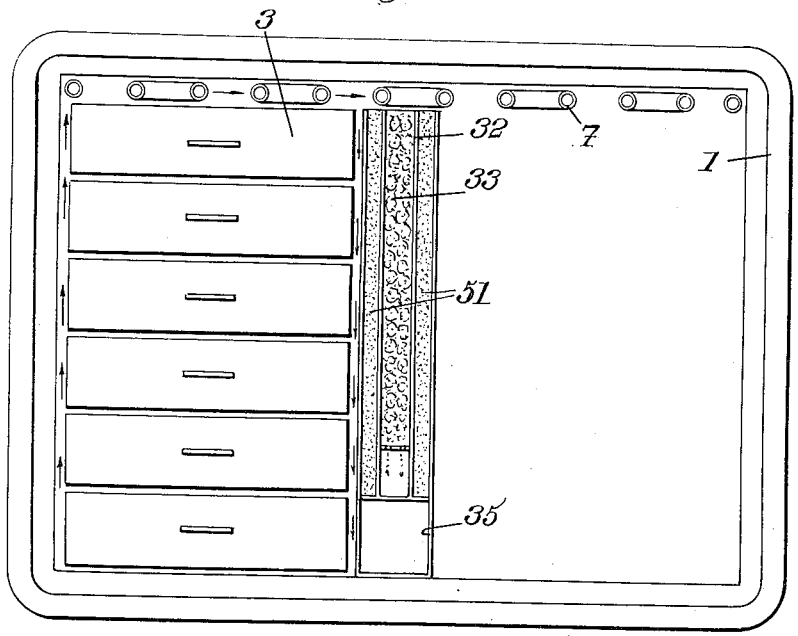
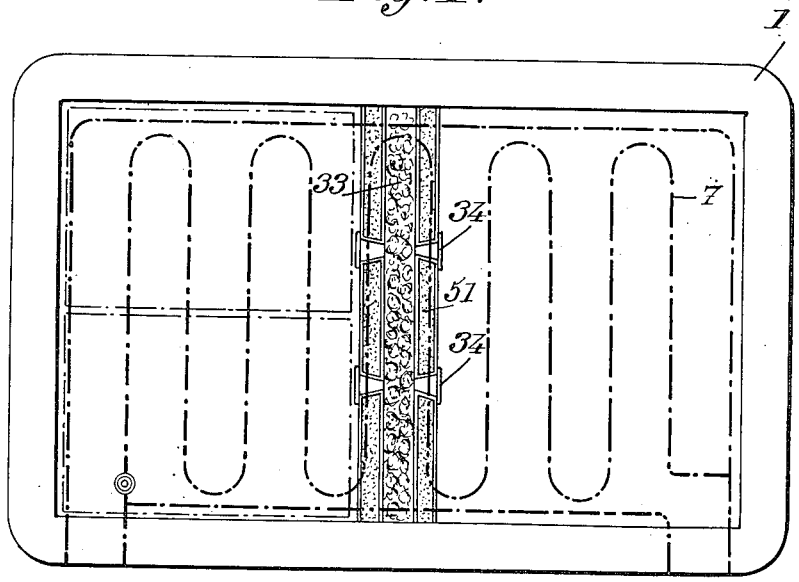

Oct. 16, 1956　　　　　F. AMIOT　　　　　2,766,598
METHOD FOR THE PRESERVATION OF FISH
Filed Oct. 23, 1950　　　　　　　　　　　6 Sheets-Sheet 6

INVENTOR
FELIX AMIOT
BY
ATTORNEYS

United States Patent Office 2,766,598
Patented Oct. 16, 1956

2,766,598

METHOD FOR THE PRESERVATION OF FISH

Felix Amiot, Neuilly-sur-Seine, France

Application October 23, 1950, Serial No. 191,666

Claims priority, application France October 27, 1949

1 Claim. (Cl. 62—170)

The present invention relates to methods and apparatus for the preservation and cold storage of perishable goods and more especially, although not exclusively, fish.

Its object is to provide methods and apparatus which are well adapted to meet the requirements of practice, in particular concerning temperature, moisture and saline atmosphere.

Preferred embodiments of my invention will be hereinafter described, with reference to the accompanying drawings, given merely by way of example, and in which:

Figs. 6 and 7 are, respectively, a vertical sectional view with parts cut away and a plan view of a container for transportation of fish made according to my invention;

Figure 1:
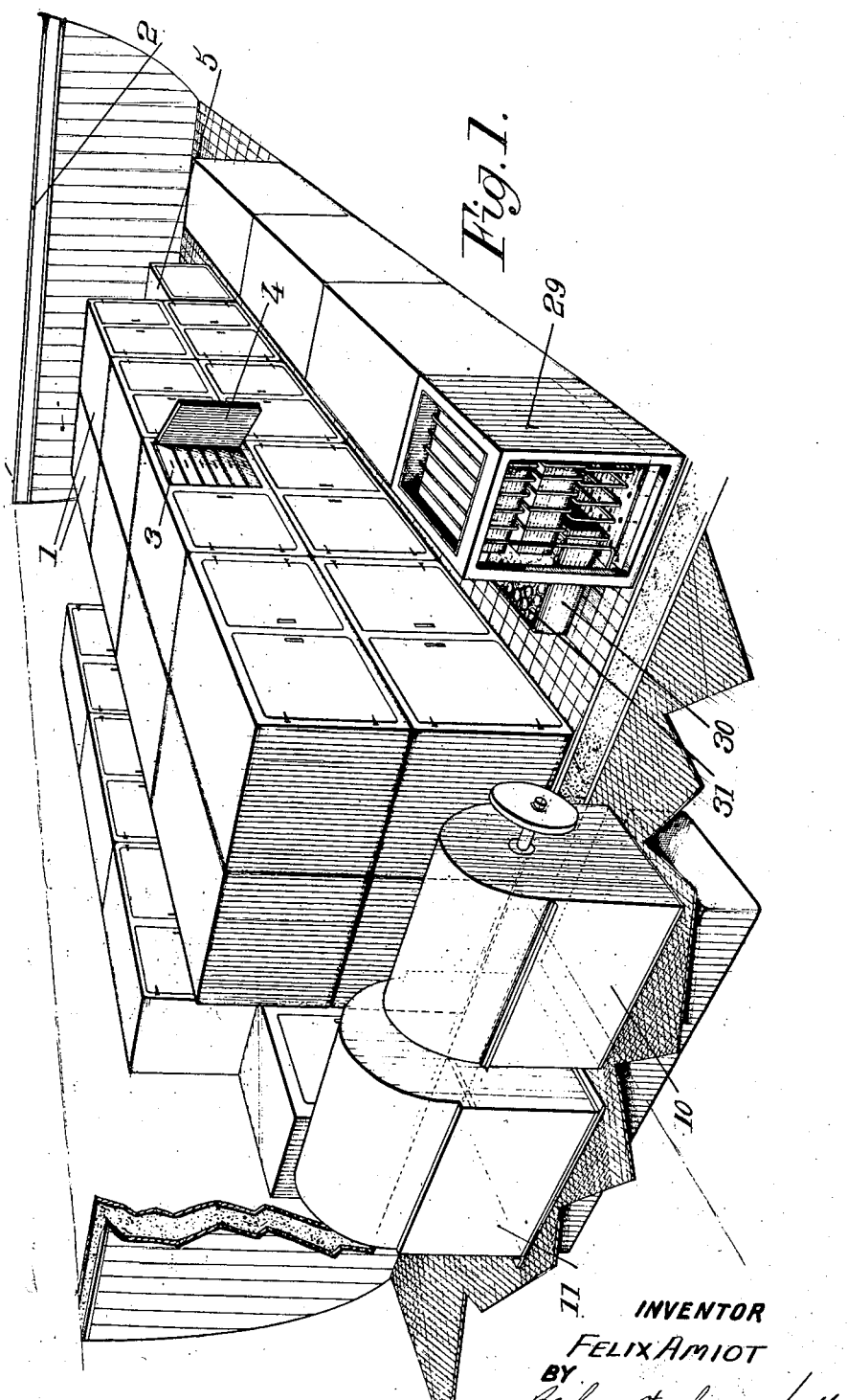
Figs. 1 and 2 are, respectively, a perspective view with parts cut away and a plan view of a ship hold containing a cold storage plant according to my invention.

It should first be remembered that there are three main methods of preserving fish, to wit, by means of ice, by freezing and by circulation of cold air.

The first of these methods consists in placing fish, immediately upon its being caught, between layers of soft water ice, so as to form superposed layers of ice and fish alternately.

This method makes it possible to preserve fish only for a limited time. The lowest layers of fish tend to be altered by penetration of more or less polluted soft water resulting from the melting of ice caused by the fact that the fish, when placed in ice, is at a temperature above 0° C. and that heat penetrates through the walls of the containers.

The risks of alteration with this method are of several kinds:

a. Fish remains partly in contact with the atmosphere, which, after a time, modifies its appearance and color;

b. It remains exposed to the development of microbes from the outside, i. e. from mucus, algae, ice and the foreign matters introduced during the handling of said fish.

c. Fish is exposed to the development of autolytic enzymes or diastases, which development is not stopped by the presence of soft water ice (not cold enough for this purpose), so that said fish softens, liquefies partly and has its smell and taste altered;

d. As the air of the ship hold or of the container is heated through its walls above 0° C., this air absorbs, as its temperature rises, water vapor up to saturation; this moisture is removed from the fish and/or from the melting ice which results in a drying action being exerted on said fish.

The freezing process has for its chief drawback that fish thus preserved is no longer fresh fish. A freezing plant calls for a powerful cold producing machine, which is very expensive. Furthermore it is necessary to provide an auxiliary plant for restoring fish from freezing temperature to ordinary temperature. Also, it is known that fish supplied in these conditions must be eaten within a very short time.

Finally, the method of preservation by means of cold air requires conditioning of the degree of moisture, with costly ventilating and filtering devices. This method is applicable chiefly for long distance conveying (colonial transports).

All these drawbacks are avoided with my invention, according to which fish, shortly after it has been caught, is immersed in sea water at a temperature close to, but above its freezing point, for instance at about −2° C. or a little lower (the freezing point of sea water is about −3° C). After this fish has thus been cooled to this temperature, it is removed from this water and placed immediately in chambers in communication with a space containing pieces of sea water ice, said fish being out of contact with said ice pieces.

While the fish containers are in the ship hold, they may be cooled by a circulation of cold brine through coil pipes extending through said containers. Once the containers have been removed from the ship and as they are being shipped to their places of destination, I make use for cooling them of sea water ice blocks placed in said containers out of contact with fish.

Figure 2:
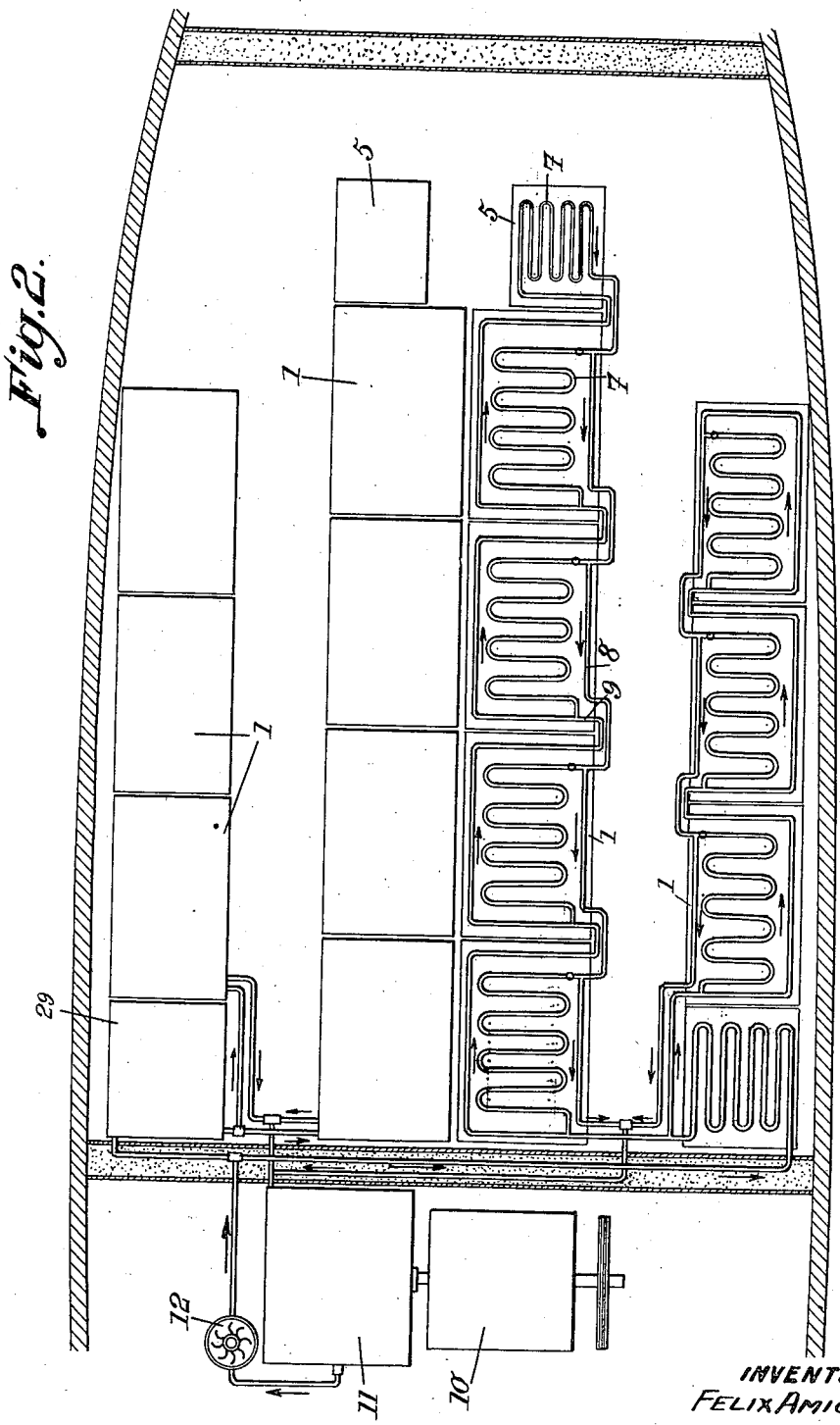
Figure 3:
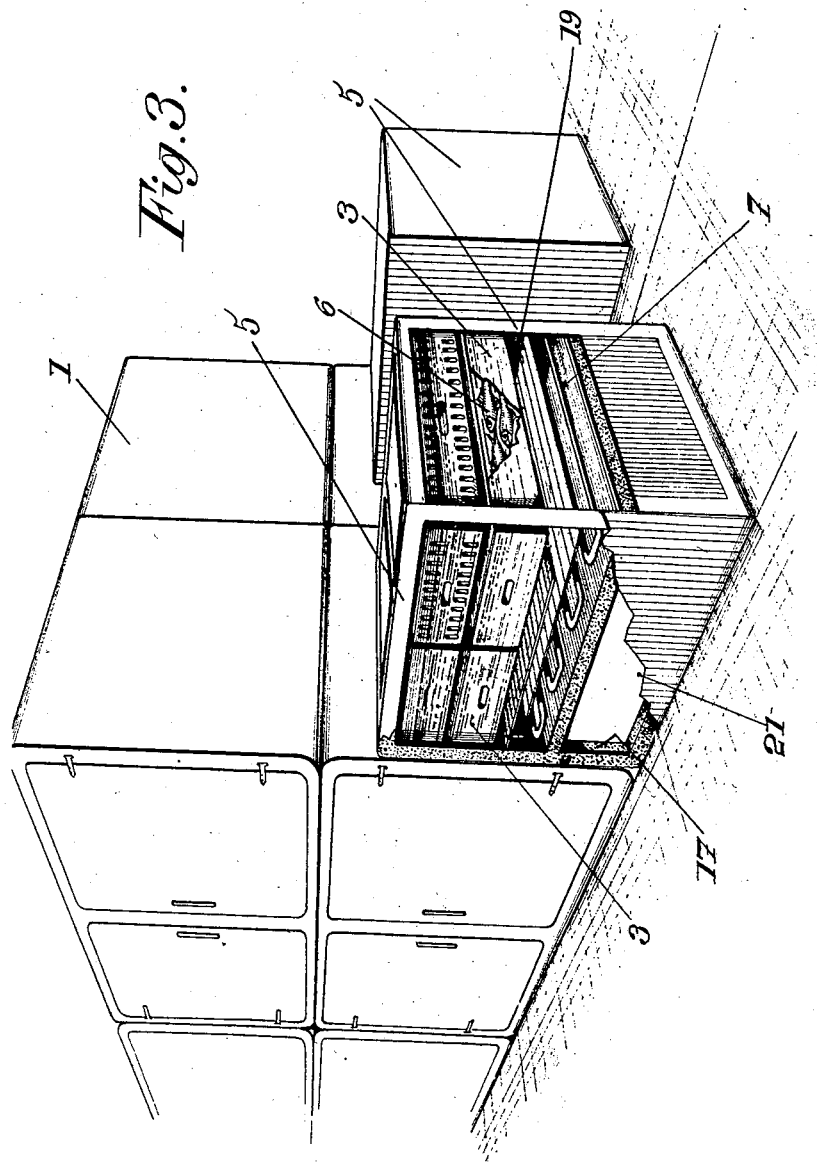
Fig. 3 is a perspective view, with parts cut away, of a portion of this plant.

Figs. 1 to 3 show a ship hold cold storage plant for applying the method according to my invention.

This plant includes a multiplicity of containers 1, advantageously of parallelepipedic shape, juxtaposed in hold 2, these containers being suitably heat insulated and each adapted to accommodate a set of superposed removable drawers 3 intended to contain fish. Each container is provided with a door 4 or the equivalent.

As shown by Fig. 3, drawers 3 (containing fishes 6) are adapted to be introduced into a cooling tank 5 provided with cooling tubes 7 for the circulation of cold brine so as to keep the sea water present in said tank 5 at a temperature below 0° C. but above the freezing point of sea water.

According to my invention, fish, as soon as it has been caught, is washed and trimmed and immediately placed in a drawer 3 which is emmersed in tank 5. When this fish has thus been cooled down to the desired temperature, say −2° C., the drawer 3 which contains it is withdrawn from cooling tank 5 and placed into one of the cooling containers 1, which are kept at the desired temperature, preferably substantially the same as that of the water in cooling tank 5. At least for their transportation containers 1 are cooled by sea water ice blocks placed in said containers out of contact with fish, as above indicated.

On the drawings, I have shown a construction in which, on board the ship both the refrigerating containers 1 and the cooling tanks 5 are cooled by the same brine circulating through winding pipes 7 and supplied from refrigerator unit 10—11 by means of a pump 12 which sends the cold brine through a pipe 9 to feed said winding pipes 7. This brine, after it has given off a portion of its cold through the walls of said pipes 7, is returned therefrom to the refrigerator unit 10—11 through a return pipe 8.

Of course, cooling tanks 5 must be suitably fed with fresh sea water to compensate for the amounts carried off to the fish when drawers 3 are withdrawn from said tanks to be inserted into containers 1. Furthermore, after a time, it is desirable to discharge the water present in said tanks and which otherwise would become more or less polluted and to replace it by fresh sea water. Before the spent sea water is allowed to flow out, it is desirable to use it to cool the fresh sea water which is being fed to the tank.

Figure 4:
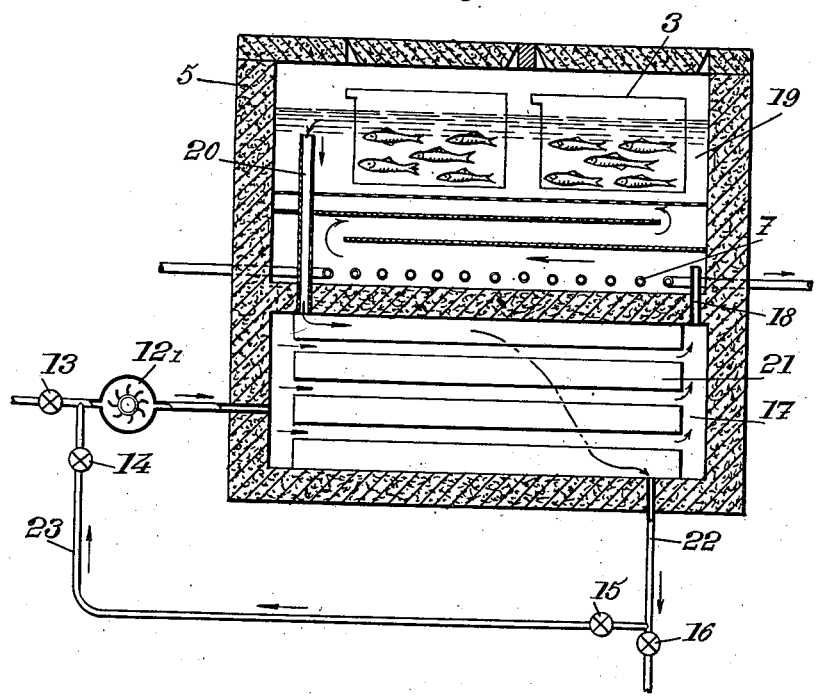
Fig. 4 is a diagrammatic sectional view of a sea water cooler included in this plant.

Fig. 4 diagrammatically shows how a tank 5 may be arranged for these purposes. Such a tank includes two superposed compartments 17 and 19 communicating together at 18. The lower compartment 17 constitutes a heat interchanger, the relatively warm liquid entering this compartment directly from the delivery of a pump $12_1$ and the colder liquid fed from a conduit 20 in communication with the upper compartment 19 flowing through winding conduits 21 and out through a discharge pipe 22. A return conduit 23 leads from pipe 22 to the intake of pump $12_1$, which is also connected with the sea. Valves 13, 14, 15, 16 are provided for controlling the circulation of water. The upper compartment 19, which is arranged to contain drawers 3, is cooled, at the bottom thereof, by winding pipes 7 for the circulation of cold brine as above described.

When valves 13 and 16 are closed and valves 14 and 15 open, sea water circulates in a closed circuit including pump $12_1$, compartment 17, passage 18, compartment 19, passage 20, conduits 21 and pipes 22 and 23 leading to pump $12_1$.

When it is desired to renew the sea water present in tank 5, valves 14 and 15 are closed and valves 13 and 16 are opened. In this case, the circuit through the tank proper is the same, but the water from compartment 19, instead of being returned to pump $12_1$ is discharged to the outside past valve 16, whereas pump $12_1$, instead of forcing water from pipe 23 into compartment 17, draws fresh water from the sea into this compartment. This sea water, which is relatively warm, is cooled, when flowing along pipes 21, by the outflowing spent water on its way to discharge valve 16.

Figure 5:
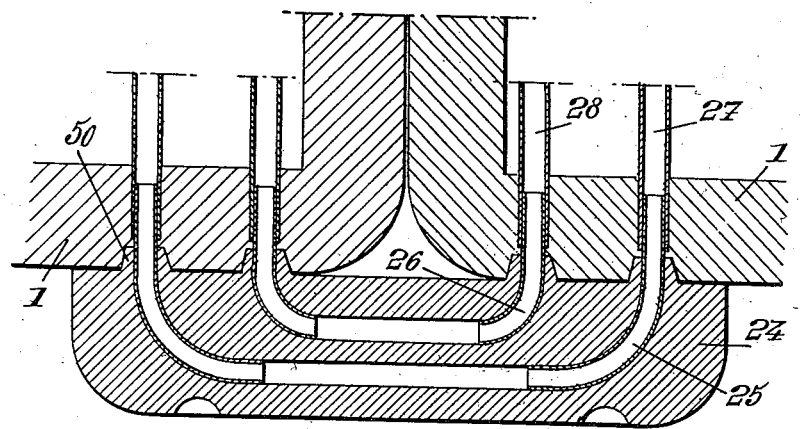
Fig. 5 is a sectional view on an enlarged scale of a pipe coupling included in this plant.

It is necessary to be able to connect together as quickly as possible any desired number of containers 1 in series with the refrigerator plant. For this purpose, as shown by Fig. 5, two adjoining containers 1 may be connected together by means of coupling means similar to electric couplings. Such coupling means include a sheath 24, made of rubber or any flexible material, containing connecting tubes 25, 26 which project at their ends from said sheath, so as to be able to engage into corresponding tube elements 27, 28 connected with the above mentioned pipes 8, 9.

In order to make the connection quite watertight, sheath 24 is provided with small cone or pyramid shaped projections engaging in corresponding recesses provided in the walls of containers 1 opposite tubes 27, 28.

In the example shown, the cold storage plant provided on the ship further includes means for making sea water ice blocks. Of course, such means might also be provided on land.

Said ice making means are shown at 29 on Figs. 1 and 2. Cold is supplied thereto by the brine circulating through pipe 9 before this pipe enters containers 1, that is to say when this brine is at the lowest temperature. Boxes 30, containing molds 31 full of sea water, are introduced into refrigerators 29, so that this water freezes into blocks or sticks, preferably of cylindrical or slightly conical shape, to be used for instance as hereinafter explained.

When the ship returns to port, fish is unloaded and conveyed to the towns where it is to be sold without leaving containers 1, which are therefore disconnected from one another and from the above described ship refrigerating plant.

Figure 8:
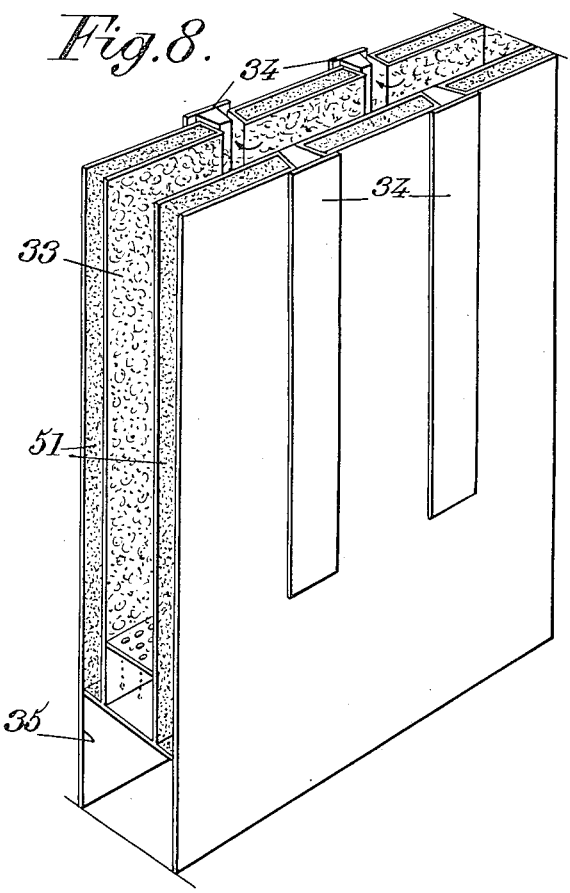
Fig. 8 is a perspective view of an element of said container.

In order to keep the inside of these containers at the desired temperature, these containers are made as follows (Figs. 6 to 8):

Each container, the outer walls of which are heat insulated includes at least one central compartment 32 (heat insulated at 51 from the remainder of the container) intended to contain sea water ice blocks or sticks 33 (for instance made as above described in the ice making apparatus 29 of the ship), the above mentioned drawers 3 which contain fish being located on either side of this central compartment 32.

The heat insulated walls 51 of this central compartment are provided with holes fitted with adjustable shutters 34 so that the air present in container 1 can come into contact with the ice blocks 33 stored in compartment 32. This air thus receives cold and salty moisture from ice elements 33, which melt slowly into liquid sea water which accumulates at 35, at the bottom of compartment 32.

By suitably adjusting the degree of opening of shutters 34, the air circulation along the ice blocks can be made such that the desired temperature, say $-2°$, is maintained inside container 1.

It is pointed out that even when a cooling action is exerted through cold brine circulating through said pipes 7 (whether the containers are still in the ship or are being conveyed on land), this is combined with a cooling action exerted by sea water ice blocks 33 placed in compartments 32, because they supply a certain amount of salty moisture which is beneficial for the preservation of fish.

Figure 9:
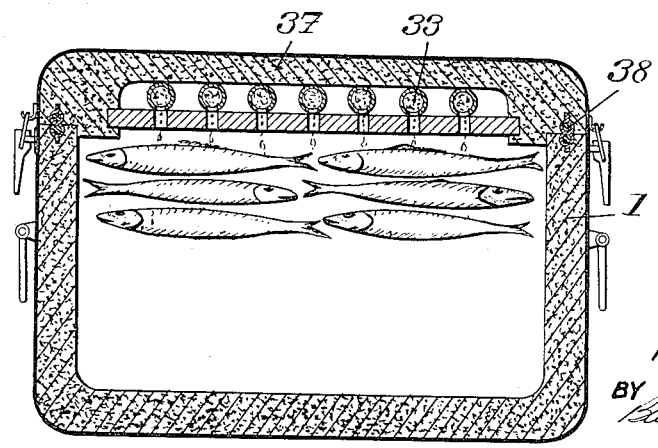
Fig. 9 shows another embodiment of such a container.

Fig. 9 shows another construction of containers 1. In this case, the sea water ice blocks are placed in the cover 37 of this container, suitable watertight means being provided at 38.

It is pointed out that these containers can be used not only for transporting perishable goods but also for storing them. Adjustment of shutters 34 makes it possible to vary the storage temperature within certain limits.

What I claim is:

The method of preserving and storing fish which comprises immersing it, shortly after it has been caught, into sea water at a temperature close to but above its freezing point, allowing this fish to cool down to this temperature, then removing it from this water and placing it in a space in communication with a space containing pieces of sea water ice, said fish being out of contact with said ice pieces.

References Cited in the file of this patent

UNITED STATES PATENTS

| Number | Name | Date |
|---|---|---|
| 608,701 | Morse | Aug. 9, 1898 |
| 1,080,215 | Haines | Dec. 2, 1913 |
| 1,123,701 | Dahl | Jan. 5, 1915 |
| 1,174,256 | Klein | Mar. 7, 1916 |
| 1,322,312 | Larsen | Nov. 18, 1919 |
| 1,404,352 | Eaton | Jan. 24, 1922 |
| 1,405,865 | Pettet | Feb. 7, 1922 |
| 1,912,896 | Hiller | June 6, 1933 |
| 1,922,795 | De Rome | Aug. 15, 1933 |
| 1,931,623 | Robertson | Oct. 24, 1933 |
| 1,942,307 | Reeh | Jan. 2, 1934 |
| 1,947,327 | Brettell | Feb. 13, 1934 |